(12) United States Patent
Zajchowski et al.

(10) Patent No.: US 8,367,967 B2
(45) Date of Patent: Feb. 5, 2013

(54) METHOD AND APPARATUS FOR REPAIRING THERMAL BARRIER COATINGS

(75) Inventors: Paul H. Zajchowski, Enfield, CT (US); Donn Blankenship, Southbury, CT (US); Gary C. Shubert, East Hampton, CT (US)

(73) Assignee: United Technologies Corporation, Hartford, CT (US)

(*) Notice: Subject to any disclaimer, the term of this patent is extended or adjusted under 35 U.S.C. 154(b) by 1557 days.

(21) Appl. No.: 10/976,969

(22) Filed: Oct. 29, 2004

(65) Prior Publication Data

US 2006/0091119 A1 May 4, 2006

(51) Int. Cl.
*H05B 1/02* (2006.01)

(52) U.S. Cl. ......... 219/121.59; 219/121.36; 219/121.52; 219/121.5; 313/231.41

(58) Field of Classification Search ............. 219/121.36, 219/121.48, 121.5, 121.52; 313/231.41; 29/889.1
See application file for complete search history.

(56) References Cited

U.S. PATENT DOCUMENTS

| | | | | |
|---|---|---|---|---|
| 4,118,618 A * | 10/1978 | Gauthier et al. | ......... | 219/121.58 |
| 4,121,083 A | 10/1978 | Smyth | | |
| 4,122,327 A | 10/1978 | Vogts et al. | | |
| 4,236,059 A * | 11/1980 | McComas et al. | ....... | 219/121.36 |
| 4,256,779 A | 3/1981 | Sokol et al. | | |
| 4,822,248 A * | 4/1989 | Wertz et al. | .................... | 416/192 |
| 4,851,636 A * | 7/1989 | Sugimoto et al. | ........ | 219/121.59 |
| 5,173,328 A | 12/1992 | Reiter et al. | | |
| 5,271,971 A | 12/1993 | Herb et al. | | |
| 5,285,967 A * | 2/1994 | Weidman | ........................ | 239/80 |
| 5,311,103 A | 5/1994 | Asmussen et al. | | |
| 5,723,078 A | 3/1998 | Nagaraj et al. | | |
| 6,042,880 A | 3/2000 | Rigney et al. | | |
| 6,156,994 A * | 12/2000 | Apunevich et al. | ...... | 219/121.46 |
| 6,238,540 B1 | 5/2001 | Timoshenko et al. | | |
| 6,264,817 B1 | 7/2001 | Timoshenko et al. | | |
| 6,620,645 B2 * | 9/2003 | Chandra et al. | ................. | 438/98 |
| 6,703,579 B1 * | 3/2004 | Rice | ........................ | 219/121.47 |
| 6,744,005 B1 * | 6/2004 | Beyer et al. | ............. | 219/121.41 |
| 6,845,929 B2 | 1/2005 | Dolatabadi et al. | | |
| 7,231,713 B2 * | 6/2007 | Boegli et al. | .................. | 29/889.1 |
| 2003/0165382 A1 * | 9/2003 | Suzuki et al. | ................. | 415/151 |
| 2004/0075396 A1 * | 4/2004 | Okumura et al. | .......... | 315/169.3 |
| 2004/0096581 A1 * | 5/2004 | Yashiro et al. | ............. | 427/248.1 |
| 2004/0202886 A1 * | 10/2004 | Subramanian | ................ | 428/632 |

(Continued)

OTHER PUBLICATIONS

Process Welding Systems, Inc., "Restore and Protect Worn Parts with Plasma Arc Welding Powder-Feed Solutions", Sep. 25, 2003, http://pwsweld.com, pp. 2-3.*

(Continued)

*Primary Examiner* — Mark Paschall
(74) *Attorney, Agent, or Firm* — Bachman & LaPointe, P.C.

(57) ABSTRACT

A method and apparatus for repairing a thermal barrier coating on components in gas turbine engines and the like. The apparatus includes a microplasma spray gun having an anode, cathode, and an arc generator for generating an electric arc between the anode and cathode. The apparatus includes a nozzle for emitting arc gas into the electric arc. The electric arc is operable for ionizing the gas to create a plasma gas stream. A powder injector injects powdered thermal barrier coating material into the plasma gas stream. Defective areas of the thermal barrier coating can be patched on the component without masking the component.

52 Claims, 4 Drawing Sheets

U.S. PATENT DOCUMENTS

| | | |
|---|---|---|
| 2004/0261914 A1 | 12/2004 | Boucard et al. |
| 2005/0015980 A1* | 1/2005 | Kottilingam et al. ..... 29/888.011 |
| 2005/0138805 A1* | 6/2005 | Hazel et al. .................. 29/889.1 |
| 2005/0235493 A1* | 10/2005 | Philip et al. .................. 29/889.1 |
| 2006/0037947 A1* | 2/2006 | Schneider ................ 219/121.48 |

OTHER PUBLICATIONS

Process Welding Systems, Inc., Microplasma Welding Torches, Sep. 25, 2003, http://pwsweld.com, pp. 1-2.*

European Search Report for EP Patent Application No. 05256732.8.

* cited by examiner

METHOD AND APPARATUS FOR REPAIRING THERMAL BARRIER COATINGS

FIELD OF THE INVENTION

The present disclosure generally relates to spray coating methods and apparatus and, more particularly, relates to a method and apparatus for repairing thermal barrier coatings using a microplasma spray device.

BACKGROUND OF THE DISCLOSURE

Plasma coating methods and apparatus are known. For example, one patent relates to a method and apparatus for plasma flame spray coating material onto a substrate. The patent discloses a method and apparatus for plasma flame spray coating material onto a substrate by means of passing a plasma forming gas through a nozzle electrode, and passing an arc forming current between the nozzle electrode and a rear electrode to form a plasma effluent. The method includes introducing coating material into the plasma effluent, passing the plasma effluent axially through a wall shroud extending from the exit of said nozzle electrode, and forming a flame shroud for the plasma effluent. The coating is thereby applied to the substrate.

One area where such technology is particularly advantageous is in connection with repairing thermal barrier coatings on various aircraft components, particularly gas turbine engines and their components. For example, thermal barrier coatings on turbine vanes and the like can become damaged due to a number of factors such as high operating stress, high cycle fatigue, and foreign object damage. Typically, repairing thermal barrier coatings require the component to be masked in areas where the material transfer is not required and/or not desired. Furthermore, the component typically must be removed from the engine and repaired in a dedicated facility such as an aircraft engine manufacturing plant or repair shop. Prior art methods and apparatus required masking the component and repairing the thermal barrier coatings in dedicated facilities because the coating equipment was large and not portable and spray pattern was too wide to accurately control the coating process. It would be desirable to improve the accuracy of spray coating devices so that masking and the like would not be required, as well as permitting hand spray coating repairs in the field of operation.

SUMMARY OF THE DISCLOSURE

In accordance with one aspect of the disclosure, a microplasma spray apparatus for repairing a thermal barrier coating on components in a gas turbine engine is provided. A microplasma gun includes an anode, cathode, and an arc generator for generating an electric arc between the anode and cathode. The apparatus includes a nozzle for emitting arc gas into the electric arc. The electric arc is operable for ionizing the gas to create a plasma gas stream. A powder injector injects powdered thermal barrier coating material into the plasma gas stream. Defective areas of the thermal barrier coating can be patched on the component without masking the component.

In accordance with another aspect of the present disclosure, a method for using a microplasma spray apparatus to repair the thermal barrier coating on a workpiece is provided. The method includes providing a microplasma spray gun having an anode and cathode and means for generating an electric arc between the anode and the cathode. Inert arc gas is injected through the electric arc to ionize the gas and form a plasma gas stream. Powdered thermal barrier coating material is injected into the plasma gas stream. A localized area of the workpiece is coated with the powdered the thermal barrier coating material without masking the workpiece.

In accordance with another aspect of the present disclosure, a method for repairing the thermal barrier coating of a gas turbine component using microplasma spray coating is provided. The component is repaired with the microplasma spray coating in an operating field without utilizing a dedicated spray coating facility in a manufacturing environment. A hand controlled and operated microplasma gun is utilized for applying the thermal barrier coating material. Inert arc gas is injected through an electric arc generated by the microplasma spray gun. The inert gas is ionized with the electric arc to form a plasma gas stream. Powdered thermal barrier coating material is injected into the plasma gas stream which coats a localized area of the component without masking portions of the component.

Other applications of the present invention will become apparent to those skilled in the art when the following description of the best mode contemplated for practicing the invention is read in conjunction with the accompanying drawings.

Figure 1:
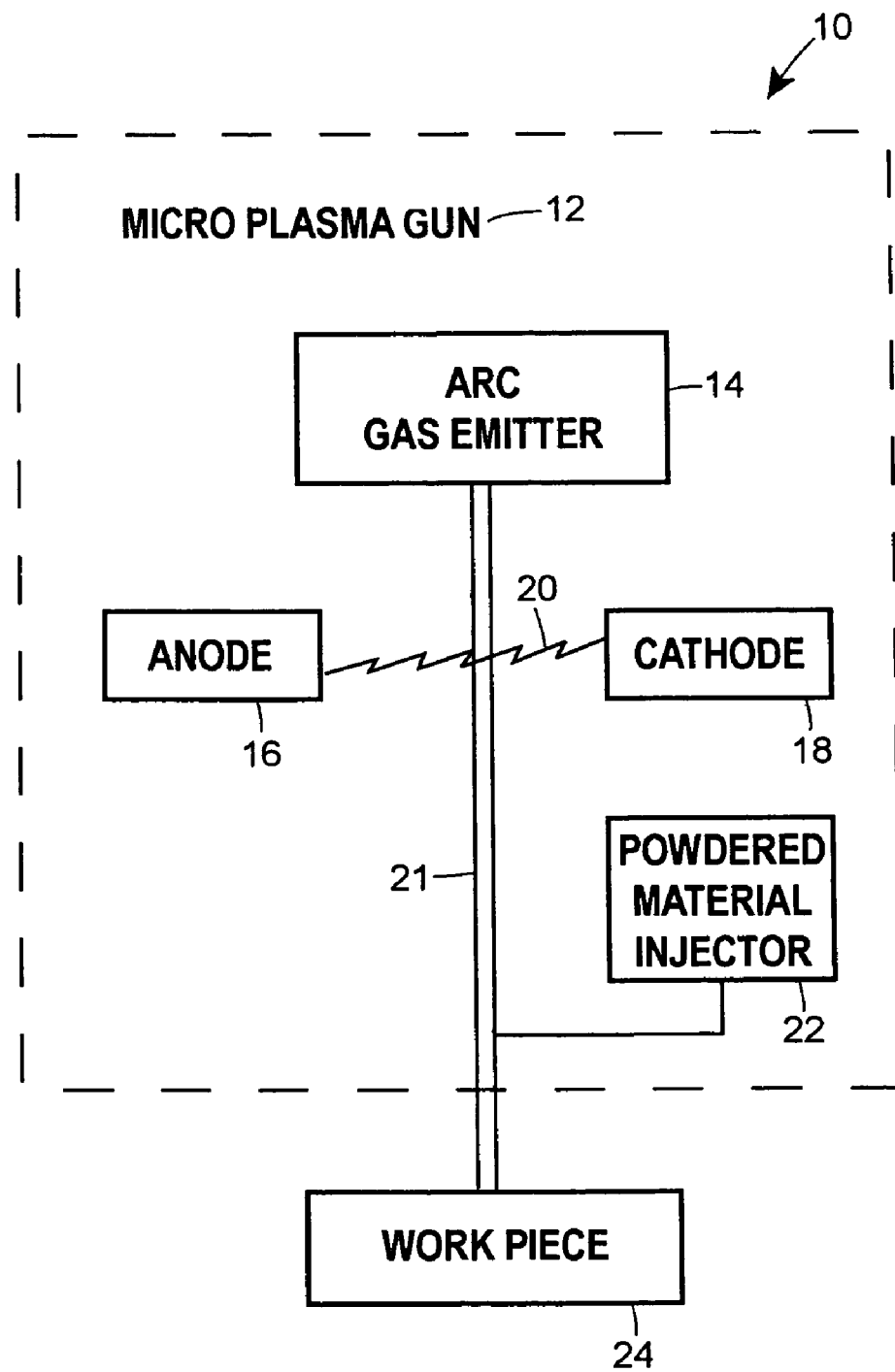
FIG. 1 is a schematic representing a microplasma spray gun and a workpiece.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Referring now to FIG. 1, a microplasma spray apparatus 10 schematically represented by the dashed box outline is depicted. In generalized terms, the microplasma spray apparatus includes a microplasma gun 12 having an arc gas emitter 14, an anode 16, and a cathode 18. An electric arc 20 is generated between the anode 16 and cathode 18. A plasma stream 21 is formed when arc gas is injected from the arc gas emitter 14 through the arc 20. A powdered material injector 22 dispenses powdered thermal barrier coating material into the plasma stream which transports the powdered material to the workpiece 24. As a result, the powdered thermal barrier coating material can patch or repair defective areas of thermal barrier coating having a thickness of approximately 0.003 to 0.020 inches in a desired location on the workpiece 24.

Figure 2:
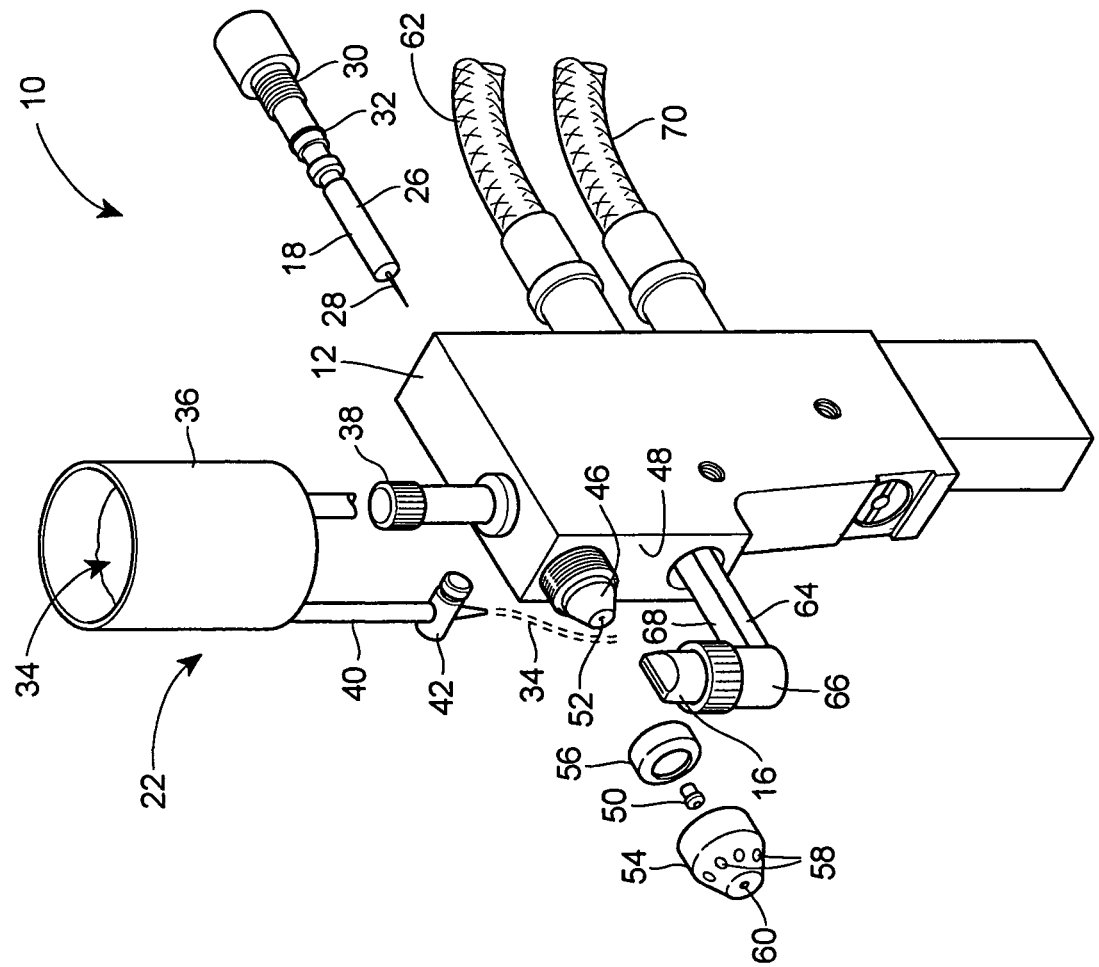
FIG. 2 is an exploded, perspective view of a microplasma spray apparatus constructed in accordance with the teachings of the disclosure.

While a number of different embodiments and structural variations can be constructed to practice such an invention, the following describes one currently known embodiment. Referring now to FIG. 2, an exploded view of such a microplasma spray apparatus, is shown, again referred to by reference numeral 10. As will be described in detail below, the microplasma spray apparatus 10 is operable for repairing many things, including, but not limited to at least a portion of the thermal barrier coating of a component such as a turbine vane (see FIG. 3) in a gas turbine engine (not shown). However, it is to be understood that the teachings of disclosure can be used to the repair thermal barrier coating on a myriad other components, including combustor liners, turbine blades, and exhaust nozzles, etc. Further, these components can be associated with aircraft, land-based vehicles, weapons, sea-faring vessels and the like.

In the depicted embodiment, the microplasma spray apparatus 10 includes the aforementioned microplasma gun 12 having an anode 16 and a cathode 18. The cathode 18 is further depicted to include an insulated body 26 with an electrode 28 extending therefrom. The cathode 18 can include threads 30 for threadingly engaging the microplasma gun 12. The cathode 18 can also include an O-ring seal 32 to seal the leak path that is created at the interface between the cathode 18 and the microplasma gun 12.

In operation, an electric arc 20 (FIG. 1) is generated between the anode 16 and cathode 18 of the microplasma gun 12. Arc gas such as, but not limited to argon, is emitted into the electric arc formed between the anode 16 and the cathode 18. It should be understood that in practice the arc gas can be emitted prior to generating the electric arc. The electric arc ionizes the gas to create the plasma gas stream 21. The ionization process removes electrons from the arc gas, causing the arc gas to become temporarily unstable. The arc gas heats up to approximately 20,000° F. to 30,000° F. as it re-stabilizes. The plasma stream cools rapidly after passing through the electric arc.

A powdered material injector 22 injects powdered thermal barrier coating material 34 into the plasma gas stream 21. The powdered material 34 is heated and super plasticized in the plasma stream and is deposited on the turbine vane (see FIG. 3) where it cools and re-solidifies to form a thermal barrier coating. The powdered material injector 22 includes a powder hopper 36 for holding the powdered thermal barrier coating material 34. The hopper 36 is attached to the microplasma gun 12 via a connector 38 formed on the microplasma gun 12. The powder hopper 36 holds powdered thermal barrier coating material to be sprayed onto the turbine vane (see FIG. 3). The powdered material 34 is channeled through a discharge chute 40 and controlled by a valve 42 positioned in the discharge chute 40. The valve 42 can be mechanical or electromechanical as is known to those skilled in the art. Powder may also be injected into the plasma stream via a powder gas line from a standard powder feeder (not shown).

A nozzle shroud 46 positioned on a forward wall 48 of the microplasma gun 12 holds a nozzle insert 50 and permits the electrode 28 to extend through a center aperture 52 formed in the nozzle shroud 46. The nozzle insert 50 can be threadingly attached to an end of the nozzle shroud 46. A shield gas cap 54 is positioned adjacent the nozzle shroud 46. An insulator 56 is positioned between the shield gas cap 54 and the nozzle shroud 46 to electrically isolate the shield gas cap 54 from the nozzle shroud 46. The shield gas cap 54 can be pressed to fit onto the nozzle shroud 46 and over the insulator 56. The shield gas cap 54 includes a plurality of through apertures 58 for permitting shield gas to flow therethrough and shield the arc gas from ambient atmosphere. A center aperture 60 formed in the shield gas cap 54 permits high velocity arc gas to pass through and into the electric arc.

Cooling fluid, such as water or the like, is utilized to cool the microplasma gun 12. The cooling fluid is delivered to the microplasma gun 12 via a cooling fluid hose 62. The cooling fluid traverses through internal passages (not shown) in the microplasma gun 12 and flows through an inlet passage 64, into an anode holder 66 and back through an outlet passage 68. The cooling fluid reduces the temperature of the anode 16 during operation of the microplasma gun 12. The cooling flow rate may be approximately 1.0-1.5 gallons per minute. A second conduit 70 is connected to the microplasma gun 12. The second conduit 70 may be operable for providing electrical power, arc gas, and shield gas to the microplasma gun 12.

Figure 3:
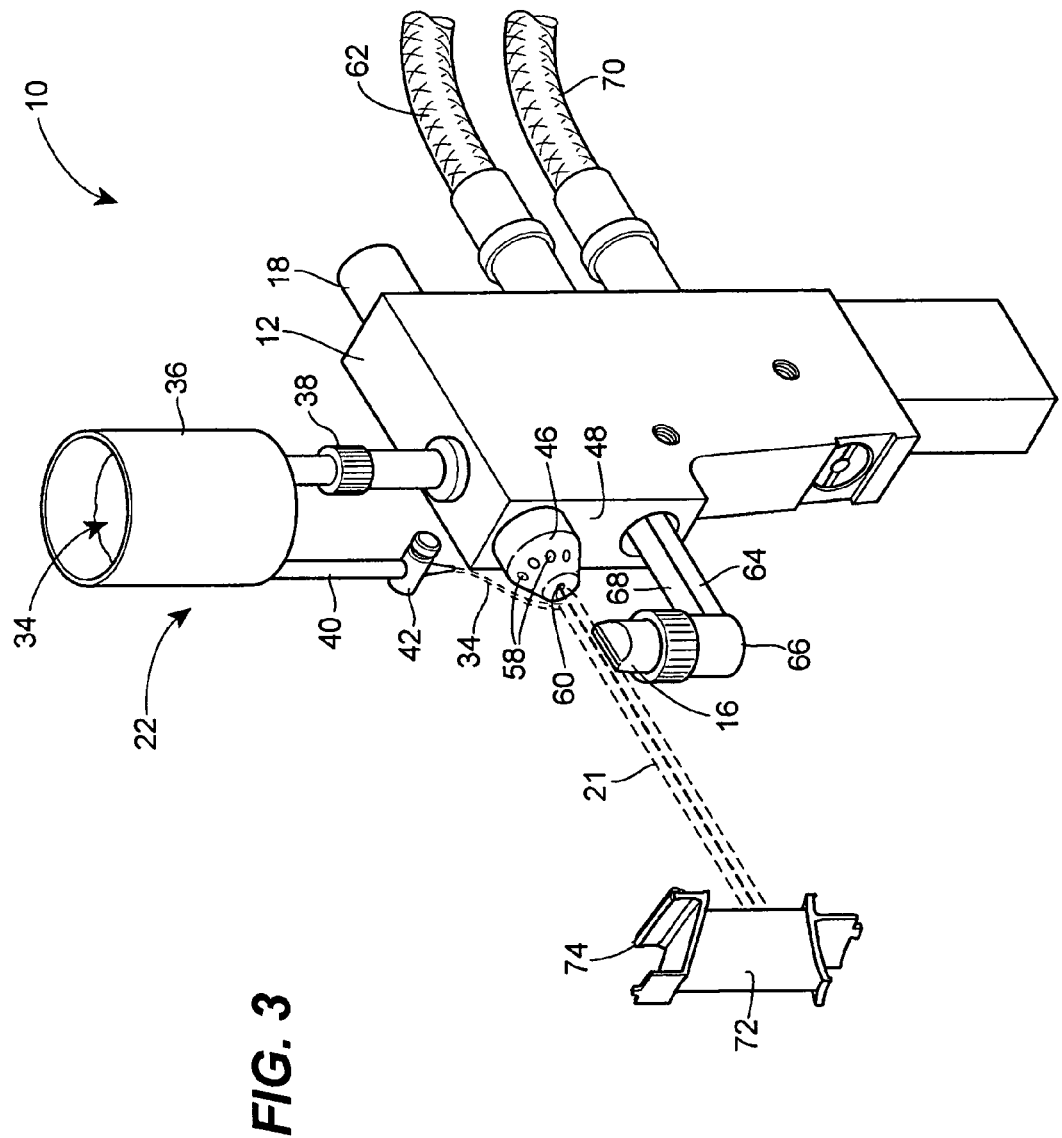
FIG. 3 is a perspective view of the microplasma spray apparatus of FIG. 1, applying a thermal barrier coating to a workpiece.

Referring now to FIG. 3, it is shown that a localized area of the turbine vane 72 having a defective area 74 of thermal barrier coating can be repaired by spray coating the area 74 with powdered thermal barrier coating material 34. The plasma gas stream 21 is directed toward the area 74 of the turbine vane 72 to be coated.

The microplasma gun 12 is operated at a relatively low power range of between approximately 0.5 Kilowatts and 2.5 Kilowatts. The low power output of the microplasma gun 12 significantly reduces the heat flow into the turbine vane 72 over that of conventional coating methods. The maximum surface temperature of the turbine vane 72 caused by the coating process is approximately 200° F. The microplasma gun 12 is operable for applying powdered thermal barrier coating material 34 to a thin wall area of the turbine vane 72 without distorting the turbine vane 72 because the low power output limits the localized stress caused by high thermal gradients.

The microplasma gun 12 can apply coating material in narrow strips of approximately 2 mm in width. This permits accurate repair of thermal barrier coatings even with a hand held device. The narrow strips of coating substantially eliminate the need for masking or otherwise covering the turbine vane 72 in areas where the coating is unwanted. The narrow spray pattern is controlled by the nozzle opening size. The hand held version of the microplasma gun 12 is so accurate that coating can be sprayed on components while they remain installed in an engine or the like.

The arc gas flow rate of the microplasma apparatus 10 may be between approximately 1.5 and 3 liters per minute. As stated above, the arc gas and shield gas are typically argon, but any suitable inert gas can be utilized as is known to those skilled in the art. The shield gas flow rate ranges between approximately 2 and 4 liters per minute for a typical application. The thermal barrier coating material for the turbine vane 72 can be a dual layer metal-composite such as a "M" CrAlY bond layer and a stabilized zirconia base ceramic layer or any other suitable alloy combination operable for reducing heat transfer and protecting components having operating temperatures that are typically above 2000° F.

The powder hopper 36 holds the powdered thermal barrier coating material 34 prior to being injected into the plasma gas stream 21 by the powder injector 22. The powdered thermal barrier coating material 34 can be injected into the plasma gas stream 21 either through gravity feed or through a pressurized system (not shown). The shut-off control valve 42 controls the powdered thermal barrier coating material 34 feed rate into the plasma gas stream 21. Powdered thermal barrier coating material 34 is transferred to the turbine vane 72 from between approximately 1 to 30 grams per minute. The microplasma gun 12 can typically apply the coating from distances ranging from approximately 1.5 inches to 6.5 inches to the turbine vane 72, but can vary depending on the coating application requirements. The microplasma spray gun 12 can be oriented between a positive 45° angle and a negative 45° angle relative to a normal axis of the turbine vane and still provide adequate material coating with a gravity feed system. A pressure feed system provides unlimited angles of orientation for the microplasma gun 12. The microplasma spray gun 12 generates a relatively low noise level that ranges from between 40 and 70 decibels due to the low power output, thereby making the apparatus 10 suitable for hand held application. Current U.S. government regulations require hearing protection when environmental noise reaches 85 decibels. The microplasma spray apparatus 10 can be hand held or alternatively held in an automated fixture (not shown) that is computer controlled.

Figure 4:
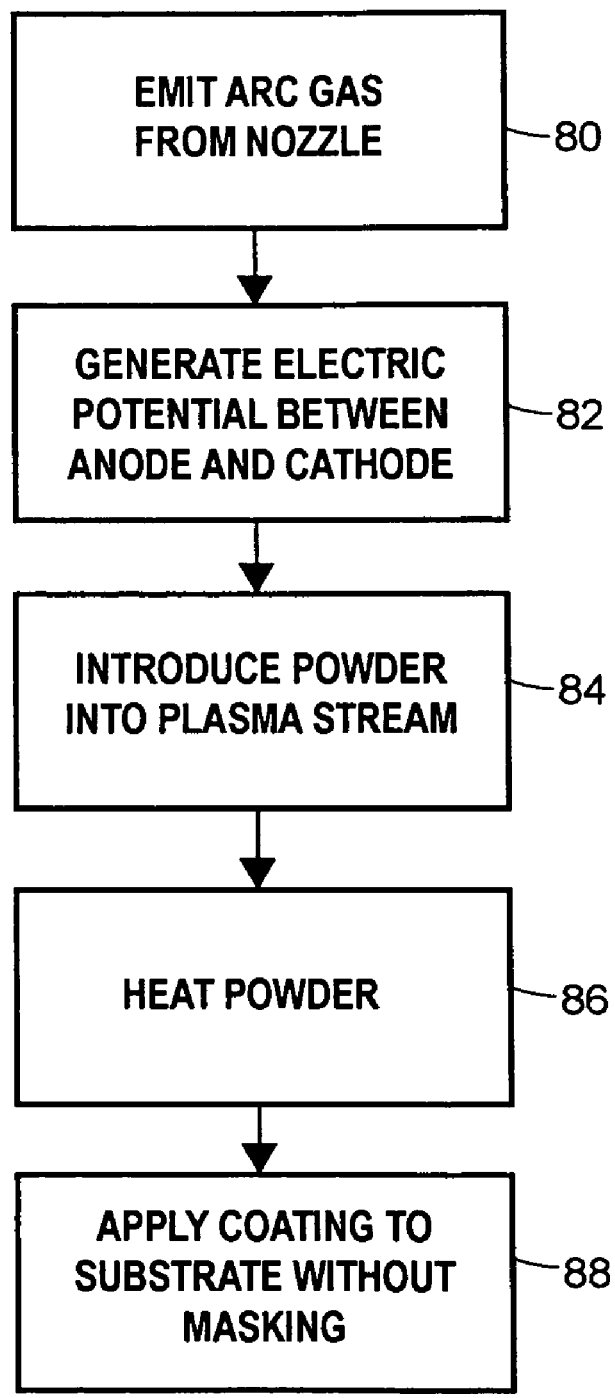
FIG. 4 is a flowchart describing the process for applying thermal barrier coating with a microplasma spray device to a workpiece without masking.

Referring now to FIG. 4, a block diagram generally describing the operation of the microplasma spray apparatus 10 and the plasma spray coating process is illustrated. Initially, at block 80, arc gas is emitted from the nozzle insert 50. An electric potential is generated between the anode 16 and the cathode 18 of the plasma spray gun 12 and is directed through the arc gas, as described in block 82. Arc gas is directed through the electric potential to create the plasma stream 21. At block 84, powdered thermal barrier coating material 34 is injected into the plasma stream 21. At block 86, the plasma stream heats the powdered material 34 to a "super plasticized" condition such that the powdered thermal barrier coating material 34 is malleable when it is applied to a workpiece. At block 88, the powdered thermal barrier coating material 34 is applied to an unmasked substrate. The powdered thermal barrier coating material 34 then cools and solidifies as a hard coating on the substrate.

While the preceding text sets forth a detailed description of certain embodiments of the invention, it should be understood that the legal scope of the invention is defined by the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A microplasma spray apparatus for repairing a thermal barrier coating on components in a gas turbine engine, comprising:
    a microplasma gun including an anode, a cathode, and an arc generator for generating an electric arc between the anode and cathode;
    a nozzle for emitting arc gas into the electric arc, the electric arc operable for ionizing the gas to create a plasma gas stream; and
    a powder injector for injecting powdered thermal barrier coating material into the plasma gas stream and patching a defective area of the thermal barrier coating, the thermal barrier coating being applied without masking any portion of the component or stripping a remaining non-defective thermal barrier coating on the component,
    wherein said cathode includes an electrode extending therefrom and disposed through an aperture of said nozzle, and said anode is disposed opposite said cathode within an anode holder mounted to an exterior surface of said microplasma gun.

2. The microplasma spray apparatus of claim 1, wherein the microplasma gun operates at a relatively low power range between approximately 0.5 Kilowatts and 2.5 Kilowatts.

3. The microplasma spray apparatus of claim 1, wherein the microplasma gun is operable for applying the thermal barrier coating to thin walled portions of the component without distorting the component.

4. The microplasma spray apparatus of claim 1, wherein a maximum surface temperature of the component caused by the coating process is approximately 200 degrees F.

5. The microplasma spray apparatus of claim 1, wherein the microplasma gun applies the thermal barrier coating material in narrow widths of approximately 2 mm to the component.

6. The microplasma spray apparatus of claim 1, wherein the arc gas flow rate is between approximately 1.5 and 3 liters per minute.

7. The microplasma spray apparatus of claim 1, wherein the arc gas is inert.

8. The microplasma spray apparatus of claim 1, wherein the arc gas is argon.

9. The microplasma spray apparatus of claim 1, further including a shield gas cap having shielding gas injected therethrough.

10. The microplasma spray apparatus of claim 9, wherein the shielding gas flow rate is between approximately 2 and 4 liters per minute.

11. The microplasma spray apparatus of claim 9, wherein the shielding gas is inert.

12. The microplasma spray apparatus of claim 9, wherein the shielding gas is argon.

13. The microplasma spray apparatus of claim 1, wherein the thermal barrier coating includes at least one layer of metal and ceramic based materials.

14. The microplasma spray apparatus of claim 13, wherein the thermal barrier coating material includes a "M"CrAlY bond layer and a stabilized zirconia based ceramic top layer.

15. The microplasma spray apparatus of claim 1, further including a powder hopper for holding the powdered thermal barrier coating material prior to the powdered thermal barrier coating material being injected into the plasma gas stream.

16. The microplasma spray apparatus of claim 1, wherein the powder feed rate is approximately between 1 and 30 grams per minute.

17. The microplasma spray apparatus of claim 1, further including a cooling system for cooling hot portions of the of the microplasma gun.

18. The microplasma spray apparatus of claim 1, wherein the microplasma gun applies the coating from a distance to the component of between approximately 1.5 inches to 6.5 inches.

19. The microplasma spray apparatus of claim 1, wherein the microplasma spray angle relative to a normal axis of the component is approximately between a positive 45 degree angle and a negative 45 degree angle.

20. The microplasma spray apparatus of claim 1, wherein the microplasma gun generates a noise level of between approximately 40 and 70 decibels.

21. The microplasma spray apparatus of claim 1, further including a cathode shroud surrounding a portion of the cathode.

22. The microplasma spray apparatus of claim 21, further including a shield gas cap substantially encompassing the cathode shroud, the shield gas cap operable for providing shielding gas as a barrier between the arc gas and an ambient atmosphere.

23. The microplasma spray apparatus of claim 22, further including a shield cap insulator positioned between the shield gas cap and the cathode shroud.

24. The microplasma spray apparatus of claim 1, wherein the microplasma gun is hand held.

25. The microplasma spray apparatus of claim 1, wherein the component is a turbine blade.

26. The microplasma spray apparatus of claim 1, wherein the component is a turbine vane.

27. The microplasma spray apparatus of claim 1, wherein the component is a combustor liner.

28. The microplasma spray apparatus of claim 1, wherein the component is an exhaust nozzle.

29. The microplasma spray apparatus of claim 1, wherein the component is exposed to high operating temperatures caused by combustion exhaust gas.

30. A method for repairing a thermal barrier coating on a workpiece with a microplasma spray apparatus, comprising:
   providing a microplasma gun including an anode and a cathode, said anode disposed opposite said cathode with an anode holder mounted to an exterior surface of said microplasma gun;
   injecting inert arc gas from a nozzle;
   generating an electric arc between the anode and the cathode through the arc gas;
   ionizing the arc gas with the electric arc to form a plasma gas stream;
   injecting powdered thermal barrier coating material into the plasma gas stream;
   coating a localized area of the workpiece with thermal barrier coating material without masking the workpiece; and
   patching a defective area of the thermal barrier coating without stripping the remaining non-defective thermal barrier coating on the workpiece.

31. The method of claim 30, further including operating the microplasma gun at a relatively low power range between approximately 0.5 Kilowatts and 2.5 Kilowatts.

32. The method of claim 30, further including applying the coating material to the workpiece without causing distortion of the workpiece.

33. The method of claim 30, further including applying the coating material to the workpiece in narrow widths of approximately 2 mm.

34. The method of claim 30, further including flowing the arc gas at a rate between approximately 1.5 and 3 liters per minute.

35. The method of claim 30, further including flowing the shielding gas at a rate between approximately 2 and 4 liters per minute.

36. The method of claim 30, further including feeding the powder material at a rate between approximately 1 and 30 grams per minute.

37. The method of claim 30, further including cooling the microplasma gun with a fluid cooling system.

38. The method of claim 37, wherein the cooling fluid is at least partially water based.

39. The method of claim 30, further including applying the coating to the workpiece from a distance of between approximately 1.5 to 6.5 inches.

40. The method of claim 30, further including generating a noise level of between approximately 40 and 70 decibels during operation.

41. The method of claim 30, further including patching the thermal barrier coating with a hand held microplasma spray gun.

42. A method for repairing the thermal barrier coating of a gas turbine components with a microplasma spray coating apparatus, comprising:
   using a hand controlled and operated microplasma spray gun including an anode and a cathode, said anode disposed opposite said cathode with an anode holder mounted to an exterior surface of said microplasma gun;
   injecting inert arc gas through an electric arc generated by the spray gun;
   ionizing the arc gas with the electric arc to form a plasma gas stream;
   injecting powdered thermal barrier coating material into the plasma gas stream;
   spray coating a localized area of a component with the powdered thermal barrier coating material without masking the component and without utilizing a dedicated spray coating facility; and
   patching a defective area of the thermal barrier coating without stripping the remaining non-defective thermal barrier coating on the component.

43. The method of claim 42, further including patching a defective area of the thermal barrier coating without stripping the remaining non-defective thermal barrier coating on the component and while the component remains installed on a gas turbine engine.

44. The method of claim 42, further including operating the microplasma gun at a relatively low power range between approximately 0.5 Kilowatts and 2.5 Kilowatts.

45. The method of claim 42, further including applying the coating material to the component without causing distortion of the component.

46. The method of claim 42, further including applying the coating material to the component in narrow widths of approximately 2 mm.

47. The method of claim 42, further including flowing the arc gas at a rate between approximately 1.5 and 3 liters per minute.

48. The method of claim 42, further including flowing the shielding gas at a rate between approximately 2 and 4 liters per minute.

49. The method of claim 42, further including feeding the powder material at a rate between approximately 1 and 30 grams per minute.

50. The method of claim 42, further including cooling the microplasma gun with a water cooling system.

51. The method of claim 42, further including applying the coating to the component from a distance of between approximately 1.5 to 6.5 inches.

52. The method of claim 42, further including generating a noise level of between approximately 40 and 70 decibels during operation.

* * * * *